United States Patent [19]
Kanamaru et al.

[11] Patent Number: 6,096,284
[45] Date of Patent: *Aug. 1, 2000

[54] CARBON BLACK AND THE PROCESS FOR PRODUCING THE SAME

[75] Inventors: Shinichi Kanamaru; Yutaka Fukuyama, both of Kitakyushu; Hideyuki Hisashi, Kanagawa, all of Japan

[73] Assignee: Mitsubishi Chemical Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,516

[22] Filed: Feb. 24, 1997

Related U.S. Application Data

[63] Continuation of application No. 08/680,027, Jul. 15, 1996, abandoned.

[30] Foreign Application Priority Data

Jul. 14, 1995 [JP] Japan .................................... 7-178441
Jan. 17, 1996 [JP] Japan .................................... 8-006089

[51] Int. Cl.$^7$ ........................................................ C09C 1/50
[52] U.S. Cl. ........................................ 423/450; 423/449.1
[58] Field of Search ................................. 423/449.1, 450

[56] References Cited

U.S. PATENT DOCUMENTS 5,382,621  1/1995  Laube ....................................... 524/496

OTHER PUBLICATIONS

Studebaker in Rubber Chemistry and Technology vol. 30 pp. 1412–1415, 1957 no month.

*Primary Examiner*—Steven P. Griffin
*Assistant Examiner*—Stuart L. Hendrickson
*Attorney, Agent, or Firm*—Oblon, Spivak, McClelland, Maier & Neustadt, P.C.

[57] ABSTRACT

The present invention relates to a carbon black and a process for producing the same. More particularly, the present invention relates to a coloring carbon black having both high blackness and excellent dispersibility, and to a process for producing the same.

16 Claims, 1 Drawing Sheet

CARBON BLACK AND THE PROCESS FOR PRODUCING THE SAME

This application is a Continuation application of U.S. Ser. No. 08/680,027, filed on Jul. 15, 1996, now abandoned.

BACKGROUND OF THE INVENTION

1. Field of the Invention

The present invention relates to a carbon black and a process for producing the same. More particularly, the present invention relates to a coloring carbon black having both high blackness and excellent dispersibility, and to a process for producing the same.

2. Discussion of the Background

When a carbon black is used as pigment for resin, paint, or other use, dispersibility to the vehicle when kneaded to the resin, paint, or other vehicle as well as blackness and hue are of concern.

That is, in general carbon black used as a black pigment blended into paint or as another pigment, is required to have both high blackness and be easily dispersed when kneaded with the resin or vehicle and exhibit inherent blackness.

For this reason, for the purpose of getting carbon black used as resin coloring or paint that has both blackness and dispersibility, is was conventional to control properties such as specific surface area, DBP oil absorption, etc. For example, Japanese Examined Publication (KOKOKU) No. Showa 52-27632 (1977) reports, a carbon black having a specific surface area of about 120 $m^2/g$~430 $m^2/g$ as suitable as a pigment for rubber, plastic paint, reinforcing agent, or other uses. But controlling only specific surface area is not enough for getting carbon black easily dispersible to resin, paint or other vehicles and exhibit blackness. Japanese Examined Publication (KOKOKU) No. Showa 52-41234 (1977) discloses carbon black with an Iodine adsorption of 200 mg/g and oil absorption of about 180~328% as a carbon black with high blackness and good dispersibility, but it doesn't show any other factor than specific surface area and oil absorption, that affects the dispersibility.

The references described above pay attention only to the blackness in the use as a pigment filler, etc., but no quality designing considering to the dispersibility to the resin or other vehicles is achieved. An object of the present invention is to obtain a carbon black having dispersibility showing high blackness, and to obtain a method for obtaining the same.

The present inventors have studied the effect of the basic structure of carbon black on the dispersibility in the vehicle, and they have found that, in addition to the conventionally used factors such as specific surface area, and dibutyl phthalate (DBP) oil absorption, by controlling the agglomerating degree and surface roughness within a certain range, one can get a carbon black having both high blackness and excellent dispersibility.

SUMMARY OF THE INVENTION

The present invention provides for a carbon black having a nitrogen surface area ($SN_2$) of from 180 $m^2/g$ to 250 $m^2/g$, DBP oil absorption of from 55 ml/100 g to 80 ml/100 g, compressed DBP (CrDBP) of from 45 ml/100 g to 65 ml/100 g, and ash content (AsH) of no more than 1.2%.

The present invention also provides for a method for producing carbon black conducted in an oil furnace comprising a first reaction zone where fuel and combustion air or an oxygen containing gas is burned to obtain a high temperature gas, a second reaction zone situated adjacent to said first reaction zone, where a feedstock hydrocarbon is introduced to induce a carbon black producing reaction, and a third reaction zone where the gas is quenched to stop the carbon black producing reaction, wherein the combustion reaction by the feedstock hydrocarbon introduced to the second reaction zone and the oxygen from the first reaction zone is conducted 0%~30% as $C+O_2 \rightarrow CO_2$, and 70%~100% as $C+1/2O_2 \rightarrow CO$.

Now, the Present invention will be described in further detail.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein FIG. 1 provides a longitudinal cross sectional view of an apparatus for preparing a carbon black.

DETAILED DESCRIPTION OF THE PREFERRED EMBODIMENTS

Figure 1:
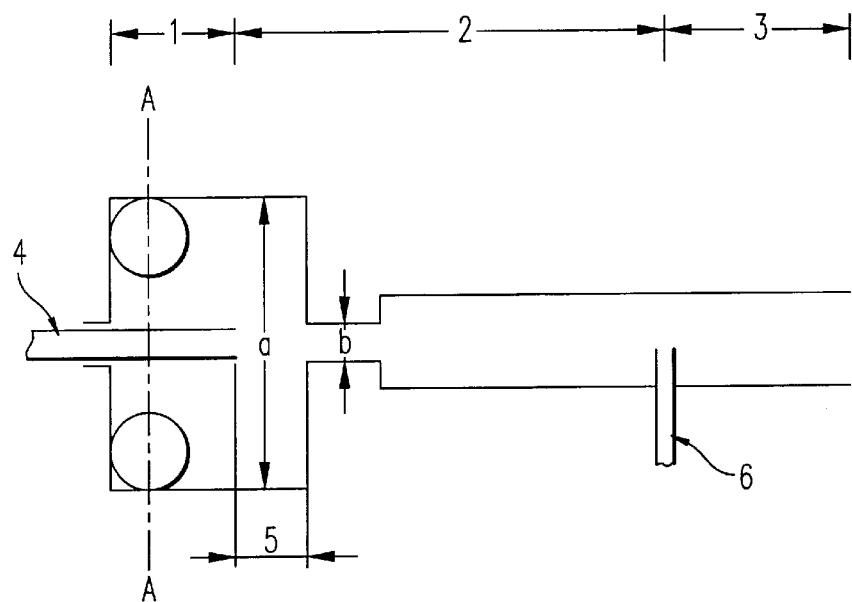

The carbon black of the present invention has an $SN_2$ of from 180 $m^2/g$ to 250 $m^2/g$, a DBP oil absorption of from 55 ml/100 g to 80 ml/100 g, a CrDBP of from 45 ml/100 g to 65 ml/100 g and an AsH (ash content) of no more than 1.2%. Preferably, the carbon black of the present invention has an $SN_2$ of from 200 $m^2/g$ to 250 $m^2/g$, a DBP of from 60 ml/100 g to 75 ml/100 g, a CrDBP of from 50 ml/100 g to 62 ml/100 g, and an AsH of no more than 0.8%.

More preferably, the carbon black has a difference between DBP and CrDBP (ΔDBP) of no more than 11 ml/100 g and a ratio of $SN_2$/SEM of from 1.2 to 1.5, wherein SEM is a specific surface area observed by an electron microscope. Preferably ΔDBP is no more than 9 ml/100 g and $SN_2$/SEM is from 1.3 to 1.5. Preferably, a blackness index is from 15 to 25. Preferably a dispersion area index is from 50 to 300.

Generally, basic properties of carbon black are determined relative to each of the properties such as diameter, structure, surface property. For example, as an index of diameter, there are the amount of iodine adsorption, nitrogen surface area, etc. As index of structure, there are DBP oil absorption, CrDBP absorption etc.

However, dispersion behavior of carbon black in a matrix seems not to be influenced by the first diameter or the first structure observed by the electron microscope, but actually, the size of these complexly gathered agglomerate structures and the amount of binder that makes the agglomerate difficult to unbind seem to be dominating factors. And the present inventors have deeply studied on the indices of this agglomerate, and found that ΔDBP, the, difference of DBP oil absorption between a sample once compressed with 24000 psi load and passed through 16 mesh sieve and a sample without compressing, is an adequate index, and by controlling this ΔDBP and CrDBP in a certain range, and at the same time by holding down AsH of a carbon black, that has a binder effect, the dispersibility of the carbon black is improved.

On the other hand, as factors affecting the blackness in a matrix, there are DBP oil absorption, specific surface area, diameter, etc., but by only increasing the specific surface area, the blackness in fact tends to increase but the surface roughness of the carbon black also increases, so the agglomeration tendency increases and this is not favorable in view of dispersibility. To solve these problems, the present inventors used $SN_2/SEM$, that is the ratio of $SN_2$ (nitrogen surface area) to SEM (specific surface area observed by an electron microscope) as an index of surface roughness, and by evaluating the blackness and dispersibility of the samples made by changing the $SN_2/SEM$ and the specific surface area, they found that the carbon black having $SN_2/SEM$ of from 1.2 to 1.5, and $SN_2$ of from 200 $m^2/g$ to 250 $m^2/g$ is the most favorable.

As a favorable method for producing the carbon black of the present invention, there is the oil furnace method. An oil furnace method comprises a first reaction zone, where inside the furnace a high temperature atmosphere of 1000~2000° C. is generated by combusting the fuel (gas or liquid), a second reaction zone, where a feedstock hydrocarbon is introduced to induce a carbon black producing reaction, and a third reaction zone where the atmosphere inside the furnace is quenched to stop the carbon black producing reaction. What is important is, to obtain a carbon black having a small diameter and narrow size distribution, it is required to mix the feedstock uniformly in the high temperature furnace, so that the temperature and carbon concentration in the atmospheres where the carbon precipitate in oversaturated domain are uniform.

For this purpose, it is required that the feedstock hydrocarbon is sprayed as finely as possible and dispersed in the furnace, so that vaporization of the oil drop is completed quickly, and also, it is important to hold down the amount of combustion of the feedstock hydrocarbon and the oxygen in the combustion gas flowed in from the first reaction zone. Preferably, the ratio (amount of carbon in combusted feedstock hydrocarbon/amount of carbon in the total feedstock hydrocarbon introduced) is kept from 0.05 to 0.3, more preferably from 0.1 to 0.2.

When the reaction is conducted in a condition that the amount of feedstock hydrocarbon is controlled to the above condition, and that the distribution of feedstock hydrocarbon in the furnace is controlled to a favorable condition, the present invention can make the ratio of the oxygen used in each of the following combustion reaction of the feedstock to the total oxygen used in combustion reaction:

0% to 30% as $C+O_2 \rightarrow CO_2$, and 70% to 100% as $C+1/2O_2 \rightarrow CO$.

So, the methods for producing a carbon black of the present invention are, a method for producing carbon black conducted in an oil furnace comprising a first reaction zone where fuel and combustion air or oxygen containing gas are burned to obtain a high temperature gas, a second reaction zone situated adjacent to the first reaction zone, where a feedstock hydrocarbon is introduced to induce carbon black producing reaction, and a third reaction zone where the gas is quenched to stop the carbon black producing reaction, wherein the combustion reaction by the feedstock hydrocarbon introduced to the second reaction zone and the oxygen flowed in from the first reaction zone is conducted 0% to 30% as $C+O_2 \rightarrow CO_2$, and 70% to 100% as $C+1/2O_2 \rightarrow CO$, a method that staying time of feedstock hydrocarbon to the reaction stopping spray is 5~30 millisecond, and also a method for producing carbon black, that in addition to the above condition, the amount of the carbon in the feedstock hydrocarbon combusted by the oxygen in a gas flowed in from the first reaction zone is from 0% to 30% of the amount of carbon in total feedstock hydrocarbon introduced.

To obtain a carbon black having a ΔDBP that is an important index of dispersibility, the residence time at the second reaction zone is controlled to from 5 millisecond to 30 millisecond more preferably from 15 millisecond to 20 millisecond. Namely this is the time a feedstock hydrocarbon takes from the introducing point that is usually the end of the introducing nozzle, to the reaction stopping point that is the point where a cooling, medium is sprayed. Then, enough heat history is given to the carbon black decomposed mixture and the unnecessary sticking between carbon black particles is prevented and carbon black with a small ΔDBP can be obtained.

Furthermore, AsH that is the amount of binder matter which inhibits dispersion to the vehicle, is held down to no more than 1%, preferably no more than 0.5%.

In the present invention, to obtain a carbon black having the above described properties, a first reaction zone where an oxygen containing gas and a combustion gas are mixed and generate a high temperature gas stream, a second reaction zone which is downstream of the first reaction zone where a feedstock hydrocarbon is introduced from a burner situated parallel or vertical to the high temperature gas stream and incompletely combusted and/or pyrolyzed to produce carbon black, and a third reaction zone where this carbon black producing reaction is stopped.

In the first reaction zone, high temperature energy is generated in the form of a high temperature gas stream, and it is preferable to generate this gas stream in a way that as little oxygen as possible is remained.

In the second reaction zone, the introduced feedstock hydrocarbon and the oxygen in the gas from the first reaction zone generate a combustion reaction, and it is preferable that the ratio of the amount of carbon in the combusted feedstock hydrocarbon to the amount of carbon in the total feedstock hydrocarbon introduced is from 0% to 30%. Also, in the second reaction zone, a turbulent flow is required to quickly vaporize the feedstock hydrocarbon, and for this purpose the gas flow rate at the choking point is from 300 m/sec to 500 m/sec, and the ratio of the diameter at the choking point to the diameter before the choking point (in FIG. 1, corresponding to a/b) is preferably 1/4 to 1/9, more preferably 1/5 to 1/6.5, then the above purpose is easily achieved.

Further, the residence time from feedstock introducing point to reaction stopping spray is from 5 millisecond to 30 millisecond, more preferably from 15 millisecond to 20 millisecond. At the third reaction zone the atmosphere inside the furnace is quenched to stop the carbon black producing reaction, usually by spraying a reaction stopping medium such as cold water so that the above mentioned high temperature gas stream is cooled efficiently to no more than 1000 to 800° C. The cooled gas stream containing carbon black is introduced to a cyclon or a bagfilter through a fume pass, and the gas and carbon black is separated and retrieved, as conventionally done. The retrieved carbon black can be after-treated according to individual purposes.

In the method of the present invention, the high temperature combustion gas stream at the first reaction zone is controlled by mixing a fuel hydrocarbon (gas or liquid) and oxygen containing gas such as air, oxygen or a mixture thereof. As fuel hydrogen, carbon monoxide, methane, natural gas, coal gas, as well as petroleum type liquid fuel such as kerosene, gasoline, naphtha, heavy oil, etc., coal type liquid fuel such as creosote oil, naphthalene oil, carbonic acid oil are suitably used.

As feedstock hydrocarbon, aromatic hydrocarbon such as benzene, toluene, xylene, naphthalene, anthrathene, coal type liquid fuel such as creosote oil, naphthalene oil, carbonic acid oil, petroleum type oil such as ethylene heavy end oil, FCC oil, etc., acetylene type hydrocarbon, ethylene type hydrocarbon such as ethylene, propylene, aliphatic hydrocarbon such as pentane, hexane, etc., are suitably used.

Now, the present invention will be described in further details with reference to Examples. However, it should be understood that the present invention is by no means restricted to such specific Examples.

EXAMPLES

Figure 2:
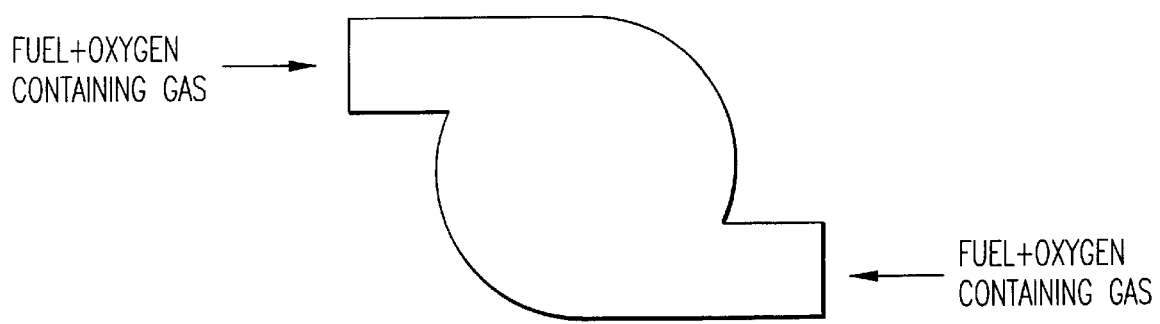
FIG. 2 provides an axial cross sectional view of an apparatus for preparing a carbon black.

Using a producing apparatus described in FIG. 1 and FIG. 2, using feedstock hydrocarbon and fuel having properties and component shown in Table I and Table 2, various kind of carbon black were produced, under the conditions shown in Table 3. In FIG. 1, 1 is first reaction zone, 2 is second reaction zone, 3 is third reaction, zone, 4 is feedstock hydrocarbon introducing nozzle, 5 is the distance between the feedstock hydrocarbon introducing point (the end of feedstock hydrocarbon introducing nozzle) and the choking point, 6 is reaction stopping medium introducing nozzle. FIG. 2 is A—A cross-sectional view of FIG. 1.

In Table 3, MO introducing point means Make Oil introducing point, namely the end of feedstock hydrocarbon introducing nozzle 4. Reaction stopping point is the place of reaction stopping medium introducing nozzle, where the medium is sprayed.

TABLE 1

| Properties of feedstock hydrocarbon | |
|---|---|
| Kind | Creosote Oil |
| specific gravity (15° C.) | 1.1 |
| carbon content (wt %) | 90.8 |
| hydrogen content (wt %) | 6.1 |
| viscosity (50° C.) | 10 cp |

TABLE 2

| Fuel | | |
|---|---|---|
| Kind | | Coal gas |
| composition (vol %) | $CO_2$ | 2 |
| | $O_2$ | 0.5 |
| | $C_nH_{2m}$ | 3.2 |
| | CO | 6.5 |
| | $H_2$ | 54 |
| | $CH_4$ | 28.6 |
| | $N_2$ | 5.2 |

Examples 1 and 2

The properties of carbon blacks obtained under the conditions shown in the Table 3 are shown in the Table 4.

Carbon black having blackness of about 25 points evaluated by the method described below as (6) are obtained. They show a result of 230~260 of dispersion area index evaluated by the method described below as (7), that means that these carbon black have both high blackness and very good dispersibility.

TABLE 3

| | Producing conditions | | | | | | |
|---|---|---|---|---|---|---|---|
| | Comparative Ex. 1 | Comparative Ex. 2 | Example 1 | Example 2 | Comparative Ex. 3 | Example 3 | Example 4 |
| Amount of air (Nm³/H) | 4,300 | 4,000 | 4,000 | 4,000 | 4,200 | 4,000 | 4,000 |
| Amount of fuel (Nm³/H) | 660 | 666 | 725 | 800 | 555 | 725 | 800 |
| Feedstock hydrocarbon introducing point (mm) | 25 | 25 | 25 | 25 | 25 | 25 | 25 |
| Amount of feedstock hydrocarbon (kg/H) | 650 | 495 | 500 | 480 | 710 | 510 | 500 |
| Distance between MO introducing point and reaction stopping point (mm) | 932 | 532 | 932 | 932 | 932 | 932 | 1,332 |

TABLE 3-continued

| | Producing conditions | | | | | | |
|---|---|---|---|---|---|---|---|
| | Comparative Ex. 1 | Comparative Ex. 2 | Example 1 | Example 2 | Comparative Ex. 3 | Example 3 | Example 4 |
| Time between MO introducing point and reaction stopping point (millisecond) | 10.7 | 5.5 | 11.2 | 11.2 | 10.9 | 11.2 | 17.2 |
| Reaction of combusted feedstock hydrocarbon and oxygen | Ratio of $O_2$ spent as $C + O_2 \rightarrow CO_2$ (%) | 37 | 33 | 0 | 0 | 34 | 0 | 0 |
| | Ratio of $O_2$ spent as $C + O_2 \rightarrow CO$ (%) | 63 | 67 | 100 | 100 | 67 | 100 | 100 |
| Amount of carbon in combusted feedstock hydrocarbon | | 0.38 | 0.36 | 0.22 | 0.2 | 0.4 | 0.26 | 0.24 |

TABLE 4

| | Properties of carbon black | | | | | | |
|---|---|---|---|---|---|---|---|
| | Comparative Ex. 1 | Comparative Ex. 2 | Example 1 | Example 2 | Comparative Ex. 3 | Example 3 | Example 4 |
| $Sn_2$ ($m^2/g$) | 282.6 | 239.0 | 243.5 | 229.9 | 271.9 | 200.1 | 220.4 |
| DBP (ml/100 g) | 67.2 | 70.2 | 64.2 | 68.5 | 70.8 | 74.0 | 72.2 |
| CrDBP (ml/100 g) | 56.0 | 49.0 | 50.6 | 57.1 | 58.2 | 62.4 | 60.2 |
| Δ DBP (ml/100 g) | 10.4 | 16.6 | 11.0 | 7.3 | 10.6 | 8.4 | 8.9 |
| AsH (%) | 0.4 | 0.3 | 0.2 | 0.1 | 0.4 | 0.0 | 0.1 |
| SEM ($m^2/g$) | 174.2 | 151.0 | 160.8 | 177.9 | 152.4 | 158.9 | 157.3 |
| $SN_2$/SEM (-) | 1.6 | 1.6 | 1.5 | 1.3 | 1.8 | 1.3 | 1.4 |
| Resin blackness index | 24.3 | 25.0 | 24.0 | 24.0 | 15.0 | 15.3 | 15.0 |
| Dispersion area index | 465 | 850 | 260 | 230 | 165 | 120 | 80 |

Examples 3 and 4

Carbon blacks showing blackness of 15 points are obtained. The dispersion area index are 80~120, that means they have very good dispersibility.

Comparative Examples 1 and 2

Carbon blacks are obtained by increasing specific surface area to obtain blackness equivalent to that of the carbon blacks of Examples 1 and 2, and in this case, blackness of 24 points is in fact obtained, but dispersion area indices are very big. Carbon black of Comparative Example 2 has specific surface area smaller than that of Comparative Example 1, but as the condition of combustion reaction of feedstock hydrocarbon is beyond the scope of the method of the present invention, so $SN_2$/SEM is big, and ΔDBP (measured by evaluation method (8) described below) that is an index of agglomeration is big, so the dispersibility is bad.

Carbon black of Comparative Example 3 can be compared with those of Example 3 and 4, having blackness of around 15 points. It is shown that the dispersion area index of Comparative Example 3 is bigger than that of Example 3, 4, because of big $SN_2$/SEM values.

Considering the above results, it is shown that, besides specific surface area and CrDBP, controlling ΔDBP and $SN_2$/SEM that are indices of agglomeration degree and surface roughness, carbon black having both high blackness and excellent dispersibility can be obtained Test Methods (1) $SN_2$ $SN_2$ is measured by BET 1 point method using an absorbed meter made by "Yuasa Ionics Co.". 0.04 g of roughly measured sample of carbon black is degasified at 300° C. for 15 minutes, and put in a U shaped tube. Sample gas prepared by adjusting to 17 psi a mixture of 15% $N_2$ gas and helium gas, and a carrier gas of pure nitrogen, were flowed in the tube so that the height of float of the attached flow amount meter are 11 cm and 17 cm, respectively. Then, U-shaped tube is immersed in a liquid nitrogen, and nitrogen in the carrier gas is adsorbed to the carbon black. The amount of nitrogen before the U-shaped tube and, after the U-shaped tube were measured, by counting the attach-detach signal when 150 mA currency is applied to the Wheatsone bridge and measuring by a microsyringe the amount of nitrogen gas when this signal is ±3 counts. Then, the sample in the U-shaped tube is precisely measured, and the specific surface area is obtained by the following equation, according to ASTM D3037-89 Method D:

$$S=1/W \times (1-P/P_O) \times (A/A_c) \times V_c \times 1188 \times (P_a/(273+T))$$

Here, $P_a$ is atmospheric pressure, $P_O$ is saturated vapor pressure, $A_c$ is measured signal value, $A$ is surface signal value, $V_c$ is the amount of measured gas, $W$ is the amount of the sample, $S$ is specific surface area.

(2) DBP oil absorption Measured in accordance with JIS K6221-1982.

(3) CrDBP oil absorption 25 g of sample is put in a cylinder, and a piston is inserted and pressure of 24000 psi (1687 kg/cm$^2$) is applied for 5 seconds by oil press.

The compressed sample is retrieved, and passed through a sieve after unbinding carbon lump. The whole process is repeated for 4 times, and then the DBP oil absorption is measured according to JIS K-6221-1982, and thus obtained value is mentioned as CrDBP oil absorption.

(4) SEM

This is measured by an electron microscope photograph. First, carbon black is put in chloroform and is irradiated by 200 KHz supersonic wave and dispersed. Then, a dispersed sample was fixed to the support membrane, observed and taken photograph by an electron microscope, and the mean surface diameter ($\Sigma nd^3/\Sigma nd^2$) was calculated. Using the obtained mean surface diameter, SEM is obtained by the following equation:

$$SEM(m^2/g) = 6000/(1.86 \times Da)$$

Here, $Da$ is the mean surface diameter.

(5) $SN_2/SEM$

Obtained by (1)/(4).

(6) resin blackness index

PVC resin is roughly kneaded by twin roll mill heated to 125° C., with slit size of 0.3 mm, for 2 minutes. Then, 0.3 g of sample is put therein, and kneaded for 7 minutes, and formed into sheet. Blackness observed by naked eyes, compared to that of PVC black sheet made by the same process using "Neo Spectra Mark II" (carbon black made by Columbian Chemicals Companies) and "#45" and "Channel #600" of Matsubishi Chemical Co., determined as standard point 30, 10 and 20, respectively. The results obtained are mentioned as resin blackness index.

(7) dispersion area index

40% of carbon black sample is added to LDPE resin 250 cc bambary type mixer and kneaded for 4 minutes at mixer temperature of 115° C.

The blended condition is as follows:

| | |
|---|---|
| low density polyethylene (LDPE) | 101.89 g |
| calcium stearic acid | 1.39 g |
| Iruganox | 0.87 g |
| carbon black | 69.43 g |

Then, the compound is diluted by twin roll mill heated at 120° C., so that carbon black concentration becomes 1%. Diluting condition is as follows:

| | |
|---|---|
| LDPE resin | 58.3 g |
| calcium stearic acid | 0.2 g |
| resin with 40% carbon black | 1.5 g |

Then the diluted compound is taken out of the roll, shaped into a sheet by being passed through a slit of 0.5 mm and rolled around a reel, and then is passed through a slit of 0.3 mm. This whole process is repeated for 10 times so that the diluted compound is mixed thoroughly. After that, roll kneading is conducted for 4 minutes and shaped into sheet by passing through a slit of 0.3 mm.

The obtained sheet is cut into chips of 3 mm square, and put between optical slide glasses and shaped into a film of 65±3 μm between slide glasses on a hotplate heated to 240° C. After that, a 3.6 mm–4.7 mm field is observed with an optical microscope of 20× magnification, and diameter distribution of lumps having a diameter of no less than 0.2 mm observed in the field is measured, and total surface area of rough particles in the field is calculated.

The number of standard particles in the field is determined by dividing the above obtained total surface area by total area of rough particles with 0.35 mm diameter. The above whole process is conducted with each compound for no less than 4 fields each, and the average of the obtained results is designated dispersion area index.

The higher this value is, the more undispersed lump in the resin is and the worse dispersity is.

(8) ΔDBP 25 g sample is put in a cylinder, piston is inserted, pressure of 24000 psi (1687 kg/cm$^2$) is applied for 5 minutes. Then the sample is taken out, put in a sieve of 1000 μm, carbon lump is unbounded and passed through the sieve, DBP oil absorption of this sample is measured in accordance with JIS K6221-1982, and the difference of thus obtained value and the DBP oil absorption before compression is mentioned as ΔDBP.

(9) AsH

Measured according with JIS K6221-1982.

(10) Calculation for obtaining ratio of $O_2$ spent in each combustion reaction

Composition and amount of high temperature gas produced in the first reaction zone is calculated as follows. Using amount and composition of introduced combustion oxygen-containing gas and amount and composition of fuel, calculation is done with a premise that the fuel is completely combusted. Thus, composition and amount of gas at normal state is obtained.

Composition and amount of gas at the exit of the second reaction zone is obtained as follows:

Composition of gas produced by carbon black producing process is analyzed by Henpel method of Gas Chromatography, and gas at the exit of second reaction zone at dry state was calculated by using nitrogen as balance gas, and those of this gas at wet state are calculated using hydrogen as balance gas.

Ratio of each combustion reaction, that is reaction of oxygen and feedstock hydrocarbon at second reaction zone is obtained as follows:

As reaction between feedstock hydrocarbon and oxygen, the following reactions are premised:

| | |
|---|---|
| $C + O_2 \rightarrow CO_2$ | (1) |
| $C + CO_2 \rightarrow CO$ | (2) |
| $H_2 + 1/2 O_2 \rightarrow H_2O$ | (3) |
| $C + H_2O \rightarrow CO + H_2$ | (4) |
| $C + 1/2 O_2 \rightarrow CO$ | (5) |

Here, gas amount and gas composition of first reaction zone and second reaction zone are compared, respectively, and the following criteria are used to determine whether each reaction occurred or not. Namely, reaction (1): if the amount of $CO_2$ in the first reaction zone is smaller than amount of $CO_2$ at the exit of the second reaction zone, it is inferred that the reaction (1) occurred, is and the amount of generated $CO_2$ is obtained as follows:

generated $CO_2$=$CO_2$ in second reaction zone–$CO_2$ in first reaction zone;

reaction (2): if the amount of $CO_2$ in the first reaction zone is greater than the amount of $CO_2$ at the exit of the second reaction zone, it is inferred that the reaction (2) occurred, and the amount of generated CO is obtained as follows:

generated CO=($CO_2$ in first reaction zone–$CO_2$ in second reaction zone)×2;

reaction (3): if the amount of $H_2O$ in the first reaction zone is smaller than the amount of $H_2O$ at the exit of the second reaction zone, this reaction is inferred to have occurred, and the amount of generated $H_2O$ is obtained as follows:

generated $H_2O$=$H_2O$ in second reaction zone–$H_2O$ in first reaction zone;

reaction (4): if the amount of $H_2O$ in the first reaction zone is greater than the amount of $H_2O$ in the second reaction zone, this reaction is inferred to have occurred, and the amount of generated CO is obtained as follows:

generated CO=generated $H_2$=$H_2O$ in first reaction zone–$H_2O$ in second reaction zone;

reaction (5): generated CO=CO at the exit of second reaction zone–generated CO by reaction (2)–generated CO by reaction (4).

Product of each reaction is obtained by the above reaction, so, from the result of reactions relating to $O_2$, that are reaction (1), (3) and (5), the ratio of each reaction at the first reaction zone is obtained, and described as follows with percentage:

percentage of $O_2$ spent to the reaction $C+O_2 \rightarrow CO_2$ (%)
percentage of $O_2$ spent to the reaction $C+1/2O_2 \rightarrow CO$ (%)

According to the present invention, novel carbon black with excellent blackness and dispersibility to the vehicle can be obtained. Further, according to the method of the present invention, such novel carbon black can be easily obtained Obviously, additional modifications and variations of the present invention are possible in light of the above teachings. It is therefore to be understood that within the scope of the appended claims, the invention may be practiced otherwise than as specifically described herein.

This application is based on Japanese Patent Applications 178441/1995 filed on Jul. 14, 1995 and 006089/1996 filed on Jan. 17, 1996.

What is claimed as new and desired to be secured by Letters Patent of the United States is:

1. A carbon black having a nitrogen surface area ($N_2SA$) of from 200 $m^2$/g to 250 $m^2$/g; a dibutyl phthalate (DBP) oil absorption of from 55 ml/100 g to 80 ml/100 g; a crushed DBP (CrDBP) of from 45 ml/100 g to 65 ml/100 g; a difference between DBP oil absorption and CrDBP (ΔDBP) of no more than 11 ml/100 g; an $N_2SA$/SEM ratio of 1.2 to 1.5, where SEM is a specific surface area observed by an electron microscope; and an ash content of no more than 1.2%.

2. The carbon black of claim 1, wherein the DBP oil absorption is from 60 ml/100 g to 75 ml/100 g, the CrDBP is from 50 ml/100 g to 62 ml/100 g, and the ash content is no more than 0.8%.

3. The carbon black of claim 1, wherein a difference between DBP oil absorption and CrDBP (ΔDBP) is no more than 9 ml/100 g, an $N_2SA$/SEM ratio is 1.3 to 1.5, and SEM is a specific surface area observed by an electron microscope.

4. The carbon black of claim 1, having a blackness index of 15 to 25, and a dispersion area index of 50 to 300.

5. A method for producing carbon black conducted in an oil furnace comprising:

1) burning fuel and a combustion air or an oxygen containing gas in a first reaction zone to obtain a high temperature gas;

2) introducing a feedstock hydrocarbon to said high temperature gas, in a second reaction zone situated adjacent to said first reaction zone, to induce a carbon black producing reaction; and 3) stopping said carbon black producing reaction, in a third reaction zone, wherein a combustion reaction by said feedstock hydrocarbon introduced into said second reaction zone and said oxygen from said first reaction zone is conducted at 0% to 30% as $C+O_2 \rightarrow CO_2$ and
70% to 100% as $C+1/2O_2 \rightarrow CO$; and wherein the method produces the carbon black of claim 1.

6. The method of claim 5, wherein a residence time from a feedstock introduction point to a stopping of said carbon black producing reaction is 5 to 30 millisecond.

7. The method of claim 5, wherein an amount of carbon in said feedstock hydrocarbon combusted is 0 to 30% of an amount of carbon in total introduced feedstock hydrocarbon.

8. The method of claim 5, wherein said fuel is selected from the group consisting of hydrogen, carbon monoxide, methane, natural gas, coal gas, kerosene, gasoline, naphtha, heavy oil, creosote oil, naphthalene oil, carbonic acid oil and a mixture thereof.

9. The method of claim 5, wherein said feedstock hydrocarbon is selected from the group consisting of benzene, toluene, xylene, naphthalene, anthrathene, creosote oil, naphthalene oil, carbonic acid oil, ethylene heavy end oil, FCC oil, acetylene type hydrocarbon, ethylene, propylene, pentane, hexane and a mixture thereof.

10. The method of claim 5, wherein said second reaction zone comprises a choking point, wherein a ratio of a diameter at said choking point to a diameter before said choking point is 1/4 to 1/9.

11. The method of claim 5, wherein said second reaction zone comprises a choking point, wherein a ratio of a diameter at said choking point to a diameter before said choking point is 1/5 to 1/6.5.

12. The method of claim 5, wherein said second reaction zone comprises a choking point, and a gas flow rate at said choking point is from 300 to 500 m/sec.

13. The method of claim 6, wherein stopping of said carbon black producing reaction is by a reaction stopping spray.

14. The method of claim 13, wherein said reaction stopping spray is cold water.

15. The method of claim 5, wherein a ratio of an amount of carbon in a combusted feedstock hydrocarbon/an amount of carbon in a total feedstock hydrocarbon introduced is from 0.05 to 0.3.

16. The method of claim 5, wherein a ratio of an amount of carbon in a combusted feedstock hydrocarbon/an amount of carbon in a total feedstock hydrocarbon introduced is from 0.1 to 0.2.

* * * * *